United States Patent [19]
Bristow, Jr.

[11] Patent Number: 5,156,058
[45] Date of Patent: Oct. 20, 1992

[54] METHOD AND APPARATUS FOR CONVERTING ROTARY MOTION TO LINEAL MOTION

[76] Inventor: Theodore R. Bristow, Jr., 5150 Marina Village Pkwy., Alameda, Calif. 94501

[21] Appl. No.: 596,780

[22] Filed: Oct. 12, 1990

[51] Int. Cl.$^5$ .............................. F16H 33/20
[52] U.S. Cl. .......................... 74/84 R; 74/61
[58] Field of Search ............ 74/61, 84 R, 84 S, 87; 366/128

[56] References Cited

U.S. PATENT DOCUMENTS

| | | | |
|---|---|---|---|
| 1,953,964 | 4/1934 | Laskowitz | 74/14 |
| 2,009,780 | 7/1935 | Laskowitz | 74/61 |
| 3,530,617 | 9/1970 | Halvorson | 46/243 |
| 3,968,700 | 7/1976 | Cuff | 74/84 S |
| 3,998,107 | 12/1976 | Cuff | 74/84 S |
| 4,631,971 | 12/1986 | Thornson | 74/84 R |

FOREIGN PATENT DOCUMENTS

| | | | |
|---|---|---|---|
| 623375 | 2/1963 | Belgium. | |
| 2610646 | 9/1977 | Fed. Rep. of Germany. | |
| 3220761 | 3/1984 | Fed. Rep. of Germany. | |
| 3519781 | 1/1987 | Fed. Rep. of Germany | 366/128 |
| 1377261 | 12/1965 | France. | |
| 7435395 | 10/1974 | France. | |
| 573912 | 3/1958 | Italy. | |

OTHER PUBLICATIONS

Article—"The Death of Rocketry" by Joel Dickinson with Robert Cook—pp. 21-24 & 37-50—copyright 1980 CIP Systems, Inc.
Paul A. Tipler; *Physics*; 1976; pp. 80, 81 and 92-95.

*Primary Examiner*—Allan D. Herrmann
*Attorney, Agent, or Firm*—Schapp and Hatch

[57] ABSTRACT

An apparatus and method of orbiting a first mass unit alternately about spaced centers of rotation with the orbit around each of the spaced centers of rotation extending for approximately one-half of a complete circle, orbiting a second mass unit side-by-side with the first mass unit but in the opposite direction, and adjusting the spaced centers of rotation relative to each other so that the resultant of first and second unbalanced centrifugal forces produced by the first and second mass units is a substantially straight line. The apparatus provides side-by-side outer wheels spinnable in opposite directions about a common axis, inner wheels positioned within the outer wheels and formed for joint rotary movement therewith about the common axis, the inner wheels being mounted for eccentric rotation with respect to the outer wheels about an offset axis so that spacing between the inner and outer wheels varies as they are rotated jointly about the common axis, a plurality of generally radially extending rods are slidably mounted in the rims of the inner and outer wheels and have the mass unit on the outer end of each such rod, inner and outer orbit limiting keepers are mounted in spaced relation along each of the rods so that the radius of orbit of the mass units is varied by alternate engagement of the orbit limiting keepers with the rims of the inner and outer wheels.

14 Claims, 4 Drawing Sheets

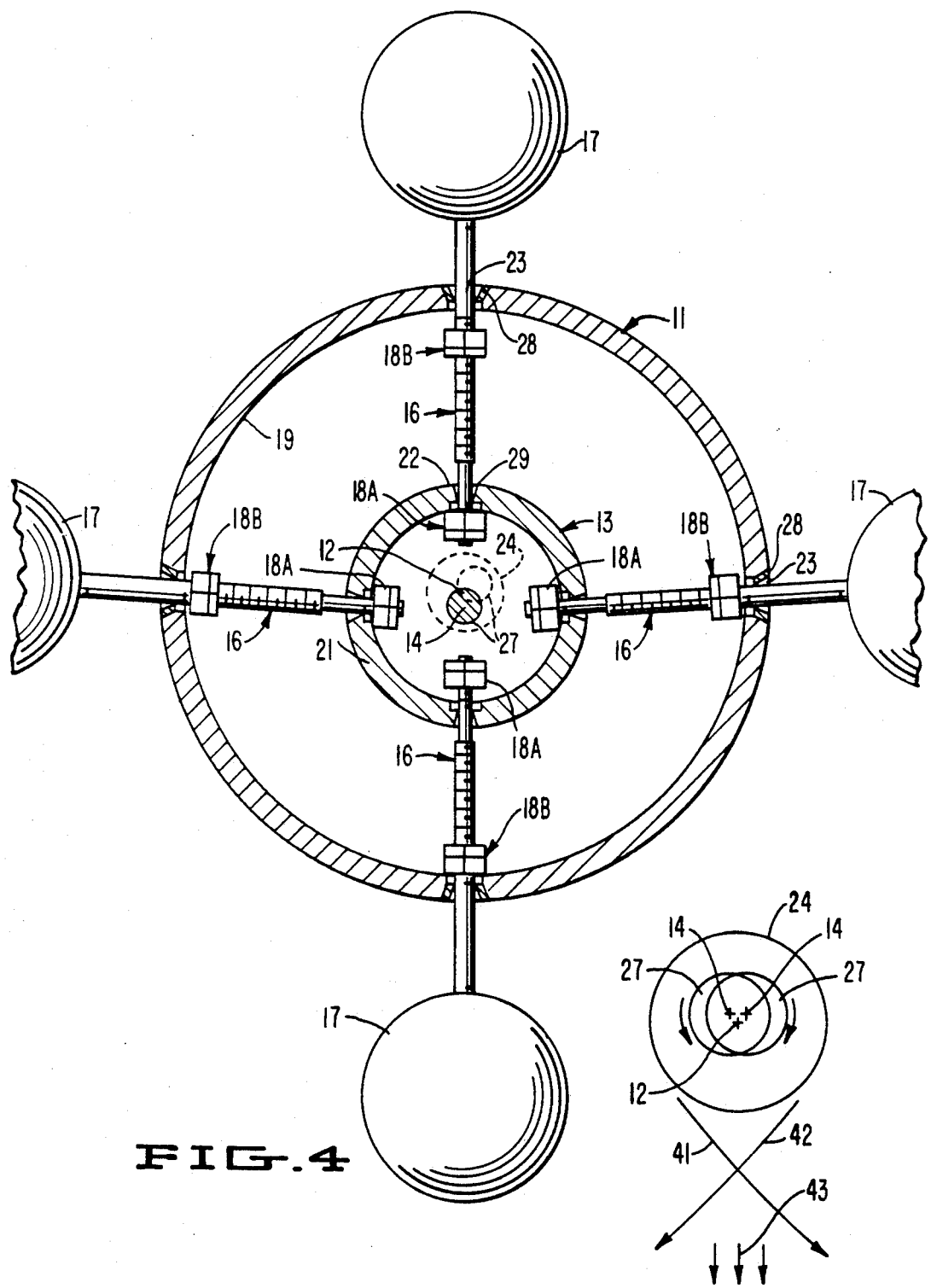

METHOD AND APPARATUS FOR CONVERTING ROTARY MOTION TO LINEAL MOTION

BACKGROUND OF THE INVENTION

1. Field of the Invention

This invention relates to self-contained apparatus for converting rotary motion into lineal motion, and more particularly to devices utilizing unbalanced centrifugal forces in such manner as to result in moving the device along a lineal path.

2. Description of the Prior Art

Numerous attempts have been made to propel a drive apparatus and attached vehicle along a lineal path with the apparatus. Such apparatus often relies upon unbalanced centrifugal forces generated by gyratory action within the apparatus. However, the known devices are uniformly incapable of exerting sufficient lineal force to be useful as a drive apparatus. The interrelationship of their component parts produce forces which tend to cancel out each other, with little or no resultant lineal force being exerted. Also, the prior art devices often are complicated and have excessive internal friction which further reduces their efficiency.

Typical of the prior art approaches to the conversion of rotary motion to lineal motion are the following patents:

| Patent No. | Date of Issue | Inventor |
|---|---|---|
| 4,631,971 | 12/30/86 | B. Thornson |
| 3,998,107 | 12/21/76 | C. Cuff |
| 3,968,700 | 07/13/76 | C. Cuff |
| 3,530,617 | 09/29/70 | E. Halvorson et al. |
| 2,009,780 | 07/30/35 | I. Laskowitz |
| 1,953,964 | 04/10/34 | I. Laskowitz |
| 1.377.261 (FR) | | |
| 573,912 (IT) | | |
| 74 35395 (FR) | | |
| 623,375 (BE) | | |
| 32 20 761 A1 (DE) | | |
| 26 10 646 (DE) | | |

The above-listed patents are believed to be relevant to the present invention because they were adduced by a prior art search made by an independent searcher, and copies of each of the above-listed patents are supplied to the Patent and Trademark Office herewith.

SUMMARY OF THE INVENTION

The method of converting rotary motion to lineal motion of the present invention involves orbiting a first mass unit alternately about spaced centers of rotation, with each such orbit extending for approximately one-half of a complete circle so as to produce a first unbalanced centrifugal force. A second mass unit is orbited side-by-side with the first mass unit but in the opposite direction to produce a second unbalanced centrifugal force. The spaced centers of rotation are adjusted relative to each other so that the resultant of the first and second unbalanced centrifugal forces extends in a substantially straight line in a desired direction.

This linear force may be used to propel an object attached to the spaced centers of rotation and without requiring loss of mass into the surrounding environment.

The self-contained lineal drive of the present invention, however, requires only the amount of energy necessary to spin the mass units and associated mechanism, with none of the energy being expended or wasted by ejecting mass from the space-lineal drive.

The rotary to lineal drive of the present invention is also useful in propelling other vehicles such as boats and automobiles. The boats need have no contact with the surrounding water other than against their hulls, which can be streamlined to the most efficient shape for traveling on the surface or under water. Because the direction of force can be changed within the vehicle, no rudders or other external apparatus are required.

In the case of land vehicles, the lineal drive means of the present invention can both support and propel the vehicle. Because of this, wheels, tires and roadways are not required and consequently the enormous amounts of money presently being spent to counteract the wear and tear of vehicle contact with rails or roadways can be eliminated.

In the case of aircraft, the wings or rotors which support the aircraft in the air can be eliminated with the lineal drive apparatus of the present invention both supporting and propelling a fully streamlined aircraft through the air. The described uses of the present invention are only illustrative and many other uses and advantages of the present invention can be found.

The apparatus for converting rotary motion to lineal motion of the present invention provides a first means for orbiting a plurality of whirling masses alternately around spaced centers of rotation with each such orbit occupying approximately one-half of a complete circle. A second such means is mounted in side-by-side relation to the first means, and means is provided for rotating the whirling masses of said first means and said second means in opposite directions. The first means and second means each generates unbalanced centrifugal forces which, when operating in conjunction provide driving force in a desired lineal direction.

The described whirling masses can be described as "flying" masses tethered to the apparatus in such manner as to restrain the whirling masses to spin around the spaced centers of rotation in the described varying orbits. Preferably, the whirling masses are carried on the outer ends of elongated members radially slidable in the first and second means. Spaced keepers on the elongated members alternately engage the first and second means to provide the described restriction of the orbits of the whirling masses.

As shown and described in this application, the apparatus of the present invention utilizes an outer driven means of predetermined radius mounted for rotation around a central axis, inner driven means of smaller radius than the outer driven means mounted for rotation about an offset axis in parallel spaced relation to the central axis, whereby the inner driven means rotates eccentrifugally relative to the outer driven means.

A plurality of generally radially extending elongated members are mounted for endwise movement through portions of the inner and outer driven means in angular spaced relation to each other, units of equal mass are provided on each of these members, and spaced keeper means on each of the members are alternately engageable with the inner and outer driven means for constraining radially outward movement of the members so as to vary the radius of orbit of the units of equal mass.

Preferably, the inner and outer driven means are formed with peripheral rims, although it should be understood that these means could be in the form of spiders or other shapes capable of functioning in the manner described. The generally radially extending members are slidably mounted through openings formed in the rims.

The outer driven means is journaled for rotation on a central shaft affixed to an object to be moved, such as a rack which is in turn attachable to a surrounding vehicle, and the inner driven means is journaled for rotation on an offset shaft also affixed to the object to be moved and in parallel spaced relation to the central shaft. The radially movable members are slidably mounted for radial movement with respect to the driven means through bearing sleeves mounted in the rims of the inner and outer driven means. These bearing sleeves are tapered to accomodate tilting of the members relative to the driven means caused by the eccentric rotation of the inner driven means relative to the outer driven means.

Units of equal mass are mounted on outer ends of the radially movable members in spaced relation to the outer driven means whereby the units of equal mass move alternately toward and away from the outer periphery of the outer driven means in variable orbits responsive to the eccentricity of the inner driven means relative to the outer driven means.

The keeper means on each of the radial members are spaced apart along these members by approximately the same distance as the distance between the inner surfaces of the rims of the inner and outer driven means approximately halfway between maximum and minimum eccentricity of the rim of the inner driven means relative to the rim of the outer driven means.

As shown in the drawings, the outer driven means is in the form of an outer wheel having an hub portion journaled to spin on a central shaft formed for attachment to an object to be moved in the desired lineal direction, the outer wheel having a peripheral rim provided by a cylindrical wall. The inner driven means is in the form of an inner wheel having a hub portion journaled to spin on an offset shaft also formed for attachment to the object to be moved in the desired lineal direction and with the axis of the offset shaft in parallel spaced relation to the axis of the central shaft, the inner wheel having a peripheral rim provided by a cylindrical wall.

The above-described drive units are carried in side-by-side relation for coaxial counterrotation about the central axis whereby the unbalanced forces produced by the two drive units combine to produce a resultant straight line force on the combined drive units and hence on the vehicle or other object to which they are attached.

In the preferred form of the invention shown and described in this application, the structure includes first and second side-by-side driven outer wheels spinnable in opposite directions about a common axis and having cylindrical peripheral walls of equal diameter, first and second driven inner wheels of smaller diameter than the outer wheels positioned at least partially within the first and second outer wheels, respectively, and formed for joint rotary movement with the outer wheels, the inner wheels having peripheral cylindrical walls of equal diameter. The inner wheels are mounted for rotation about an offset axis in parallel spaced relation to the common axis so that the peripheral cylindrical walls of the inner wheels are eccentric to the peripheral cylindrical walls of the outer wheels whereby the spacing between the walls of the inner and outer wheels varies as the inner and outer wheels are rotated jointly. Drive means is provided for effecting joint rotation of the inner wheels with their respective outer wheels.

A plurality of generally radially extending rods are slidably mounted through the inner and outer walls in equal angular spacing, a mass unit is carried on the outer end of each of the radially extending rods, and inner and outer orbiting limiting keepers are mounted in spaced relation along each of the rods by a distance equal to the average distance between the inner periphery of the cylindrical wall of the outer wheel and the inner periphery of the cylindrical wall of the inner wheel so that the radius of orbit of the mass unit is varied by alternate engagement of the orbit limiting keepers with the inner peripheries of the cylindrical walls of the outer and inner wheels for varying the centrifugal force exerted by each of the unit masses as they orbit with respect to the common axis.

It is therefore a principal object of the present invention to provide a method and apparatus for converting rotary motion into lineal motion in a self-contained unit.

Another object of the present invention is to provide a method and apparatus of the character described in which the orbits of side-by-side flying mass units are constrained in such manner that the centers of orbit shift back and forth to produce unbalance centrifugal forces which combine to produce a substantially straight line lineal force extending in a desired direction.

A further object of the present invention is to provide an apparatus for converting rotary motion into lineal motion in a self-contained unit capable of propelling an attached vehicle in a desired straight line direction which can be varied from time to time as desired.

A still further object of the present invention is to provide an apparatus of the character described which is compact and sturdy with a minimum of moving parts subject to friction and wear.

Another object of the present invention is to provide an apparatus of the character described which is relatively inexpensive and requires a minimum of machining.

Other objects and features of advantage will become apparent as the specification progresses, and from the claims.

BRIEF DESCRIPTION OF THE DRAWINGS

FIG. 4 is a vertical cross-sectional view taken substantially on the plane of Line 4—4 of FIG. 3.

FIG. 5 is a diagramatic view showing the unbalanced forces generated by the apparatus of the present invention and the resultant lineal path of movement.

Figure 1:
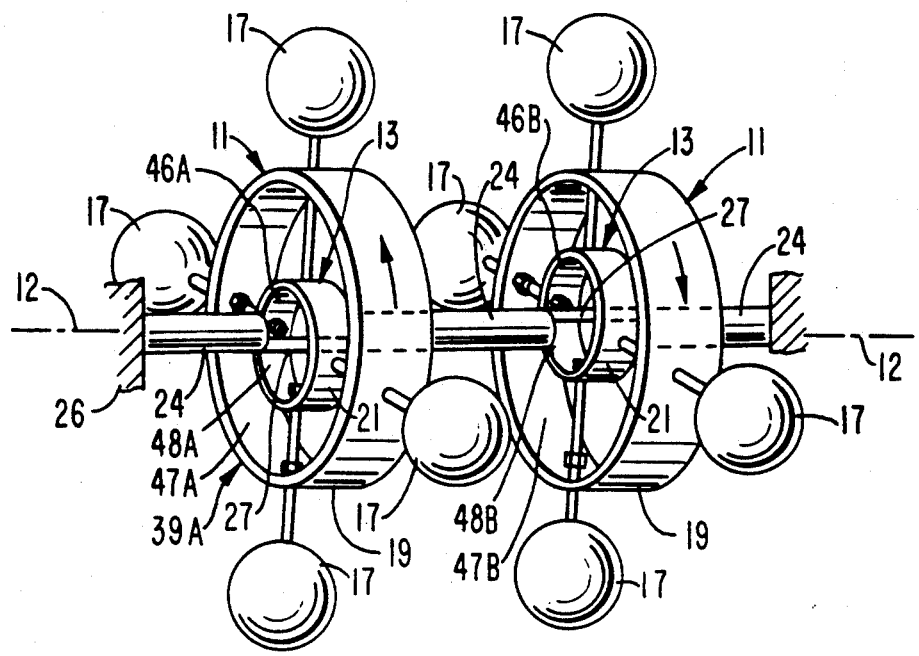
FIG. 1 is a perspective diagramatic view of an apparatus constructed in accordance with the present invention.

While only the preferrred form of the invention is illustated in the drawings, it will be apparent that various modifications could be made without departing from the ambit of the claims.

DESCRIPTION OF THE PREFERRED EMBODIMENTS

In the form of the invention illustrated in the accompanying drawings, the apparatus of the present invention, for converting rotary motion to lineal motion, provides outer driven means 11 mounted for rotation around a central axis 12, and inner driven means 13 of smaller radius than the outer driven means 11 mounted for rotation about an offset axis 14 in parallel spaced relation to the central axis 12 whereby the inner driven means 13 rotates eccentrically relative to said outer driven means 11.

A plurality of generally radially extending elongated members 16 are mounted for endwise movement through portions of the inner driven means 13 and the outer driven means 11 in angular spaced relation to each other, units of equal mass 17 are provided on each of the members 16, and spaced keeper means 18 are mounted on each of the members 16 for alternating engagement with the inner driven means 13 and the outer driven means 11 for constraining radially outward movement of the members 16 so as to vary the radius of orbit 15 of the units of equal mass 17.

As shown in the drawings, the inner driven means 13 and outer driven means 11 are formed with peripheral rims 21 and 19, although it should be noted that, in the broadest aspects of the invention, the outer driven means 11 and inner driven means 13 may be in the form of spiders or other configurations providing the described structural elements which produce the recited function. The generally radially extending elongated members 16 are slidably mounted through openings 22 formed in the outer rim 19 and openings 23 formed in the inner rim 21.

The outer driven means 11 is journaled for rotation on a central shaft 24, providing the central axis 12, attachable to an object 26 to be moved, and the inner driven means 13 is journaled for rotation on an offset shaft 27 mounted in parallel spaced relation to the central shaft 24 and providing the offset axis 14.

Figure 2:
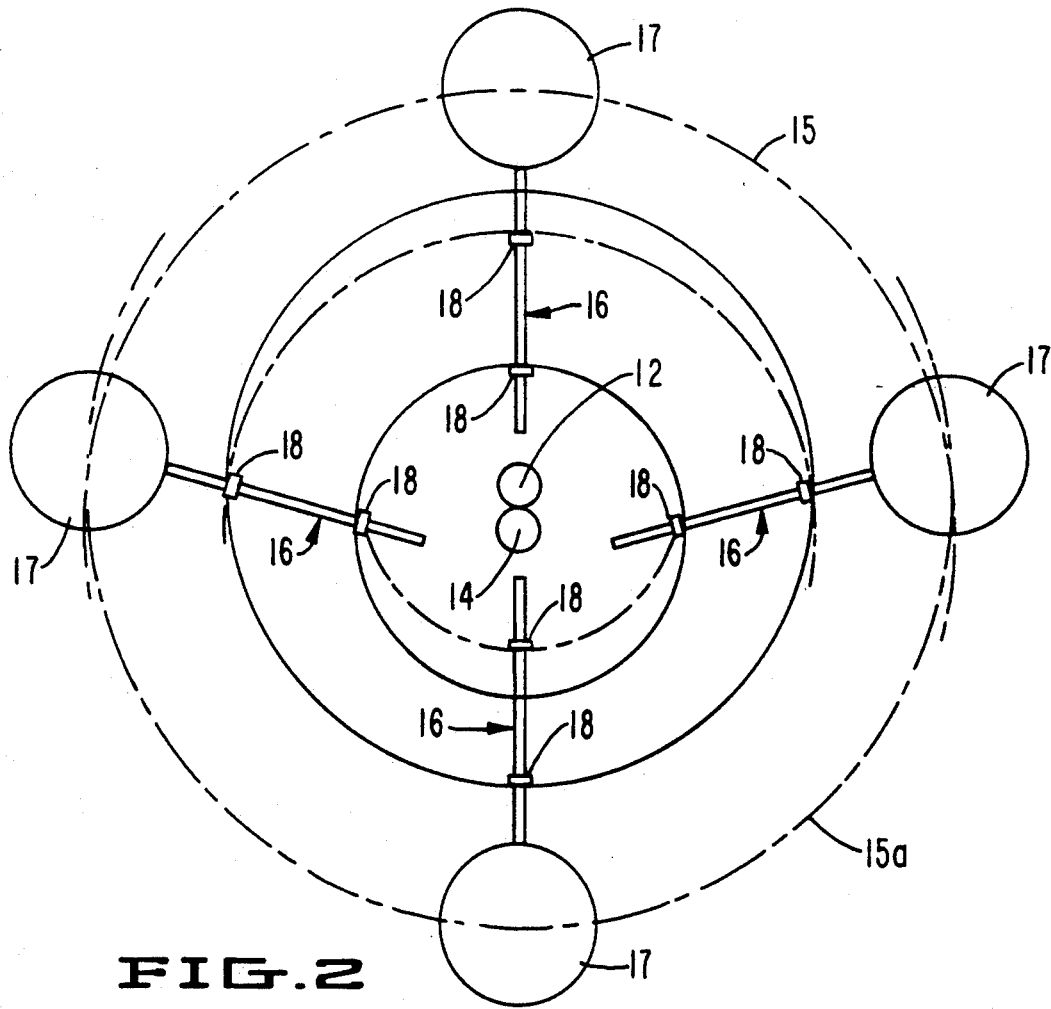
FIG. 2 is a diagram illustrating the variable orbiting of spherical mass units, with the eccentricity being exaggerated somewhat to emphasize the action of the parts.

In accordance with the invention, the members 16 are slidably mounted for radial movement with respect to the inner and outer driven means 13 and 11 through bearing sleeves 28 mounted in inner rim 21, and bearing sleeves 29 mounted in outer rim 19. The bearing sleeves 28 and 29 are preferably tapered to accomodate tilting of the members 16 relative to the rims 19 and 21 caused by the eccentric rotation of the inner driven means 13 relative to the outer driven means 11. This tilting action may best be seen in FIG. 2 of the drawings.

As here shown, the units of equal mass 17 are mounted on the outer ends of the members 16 in radially spaced relation to the outer driven means 11 whereby the units of equal mass 17 move alternately toward and away from the outer periphery of the outer driven means 11 in variable orbits 15, 15A responsive to the eccentricity of the inner driven means 13 relative to the outer driven means 11. The units of equal mass 17 may be of any suitable shape, these units here being provided in the form of metal spheres having a diametrical hole formed therethrough to accomodate the outer ends 32 of the radial members 16, the units 17 being secured to the members 16 by locknuts 33 threadably engaged with the outer ends 32 of the radial members 16.

The keeper means 18 on each of the members 16 are spaced apart along the members 16 by approximately the same distance as the distance between the inner surface of rim 19 and the inner surface of rim 21 at a position approximately halfway between maximum and minimum eccentricity of the inner rim 21 relative to the outer rim 19.

As shown in the accompanying drawings, the outer driven means 11 preferably is in the form of an outer wheel having a hub portion 34 journaled to spin on bearings 36 on the non-rotating central shaft 24 attached to the object 26 to be moved in a lineal direction, the outer wheel 11 having a peripheral rim 19 provided by a cylindrical wall. The inner driven means 13 is in the form of an inner wheel having a hub portion 37 journaled in bearings 38 to spin on the offset shaft 27, which is also formed for non-rotating attachment to the object 26 to be moved in a lineal direction, the axis 14 of the offset shaft 27 being in parallel spaced relation to the axis 12 of the central shaft 24, and the inner wheel 13 has a peripheral rim 21 provided by a cylindrical wall.

As an important feature of the present invention, two substantially similar drive units 39A and 39B, each having the described inner and outer driven means 13 and 11, radially extending members 16, units of equal mass 17 on the outer ends of members 16, and keeper means 18 on the members 16, are carried in side-by-side relation for coaxial counterrotation about the central axis 12 and offset axis 14, whereby the unbalanced forces produced by the two drive units combine to produce a resultant straight line force on the combined drive units and the objects upon which they are mounted. FIG. 5 of the drawings diagramatically illustrates these forces, the unbalanced forces of the two drive units being indicated by arrows 41 and 42, and the resultant straight line direction of motion being indicated by arrows 43.

Figure 3:
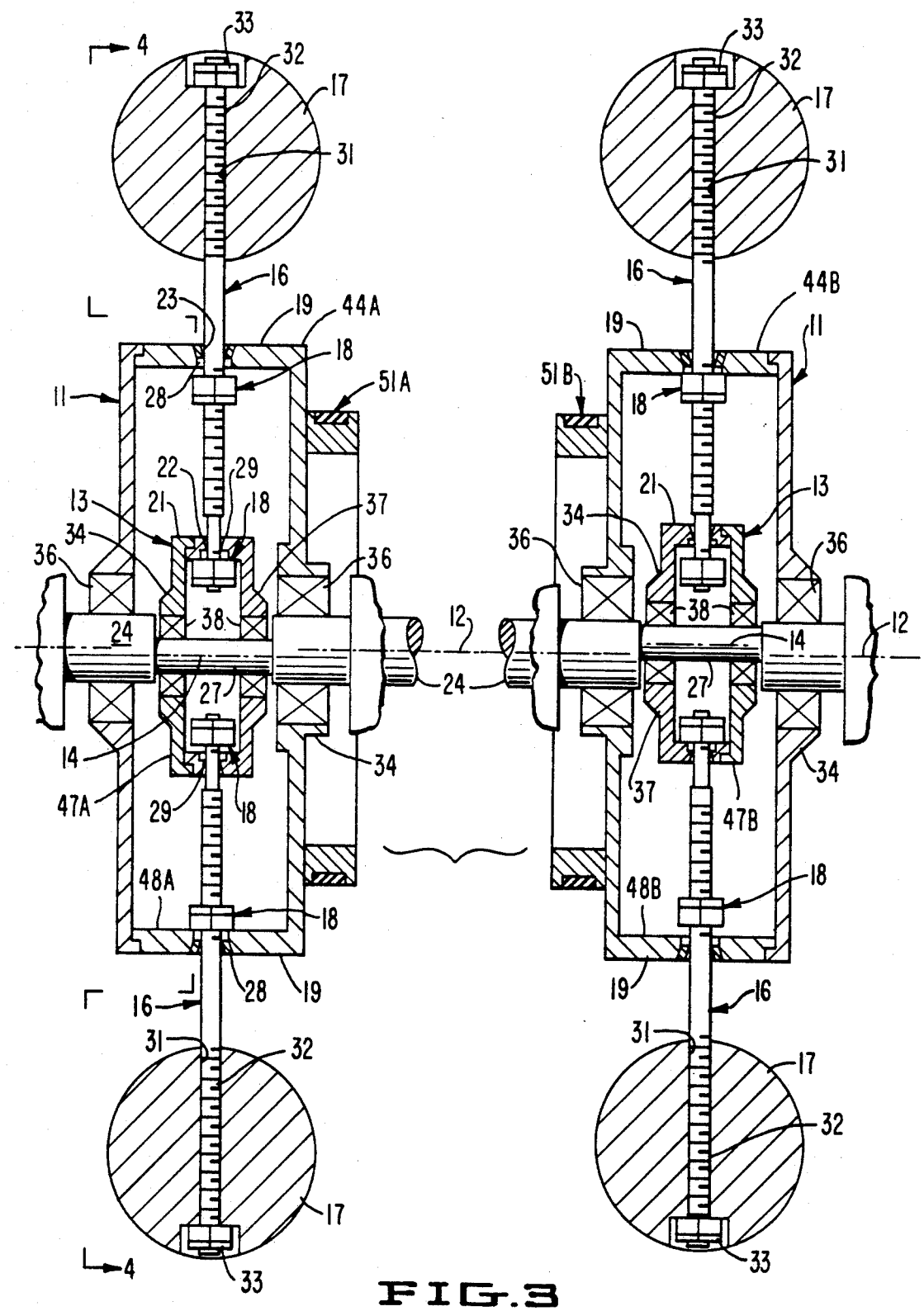
FIG. 3 is a vertical cross-sectional view of a pair of coacting rotary-to-lineal drive members constructed in accordance with the present invention.
Figure 6:
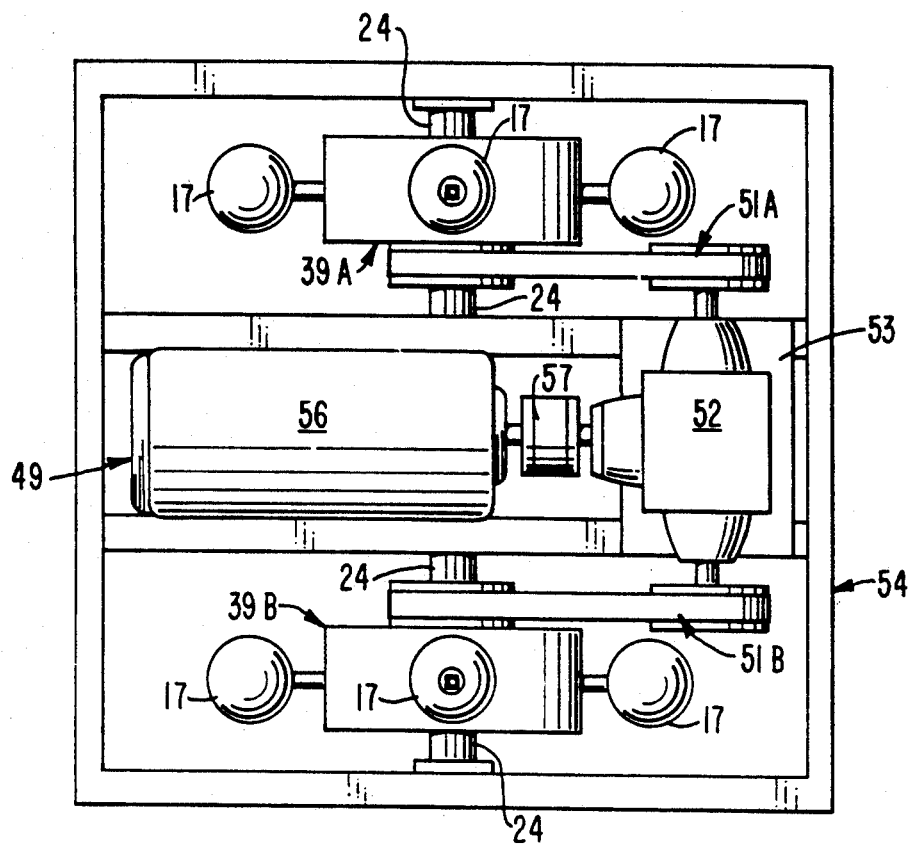
FIG. 6 is a plan view of an apparatus constructed in accordance with the present invention and utilizing the structures illustrated in FIG. 3 of the drawings.

As may be seen in the schematic of FIG. 1 and in FIGS. 3 and 6, the paired drive units 39A and 39B provide first and second side-by-side outer wheels 44A and 44B spinnable in opposite directions about a common axis 12 and having cylindrical peripheral walls 46A and 46B of equal diameter, together with first and second inner wheels 47A and 47B of smaller diameter than the outer wheels 44A and 44B, the inner wheels 47A and 47B being positioned within the first and second outer wheels 44A and 44B and formed for joint rotary movement therewith, the inner wheels 47A and 47B having peripheral cylindrical walls 48A and 48B of equal diameter.

The inner wheels 47A and 47B are mounted for rotation about an offset axis 14 which is mounted in parallel spaced relation to the common axis 12 so that the peripheral cylindrical walls 48A and 48B of the inner wheels 47A and 47B are eccentric to the peripheral cylindrical walls 46A and 46B of the outer wheels 44A and 44B whereby the spacing between the cylindrical walls of the inner and outer wheels varies as the inner and outer wheels are rotated jointly.

Figure 7:
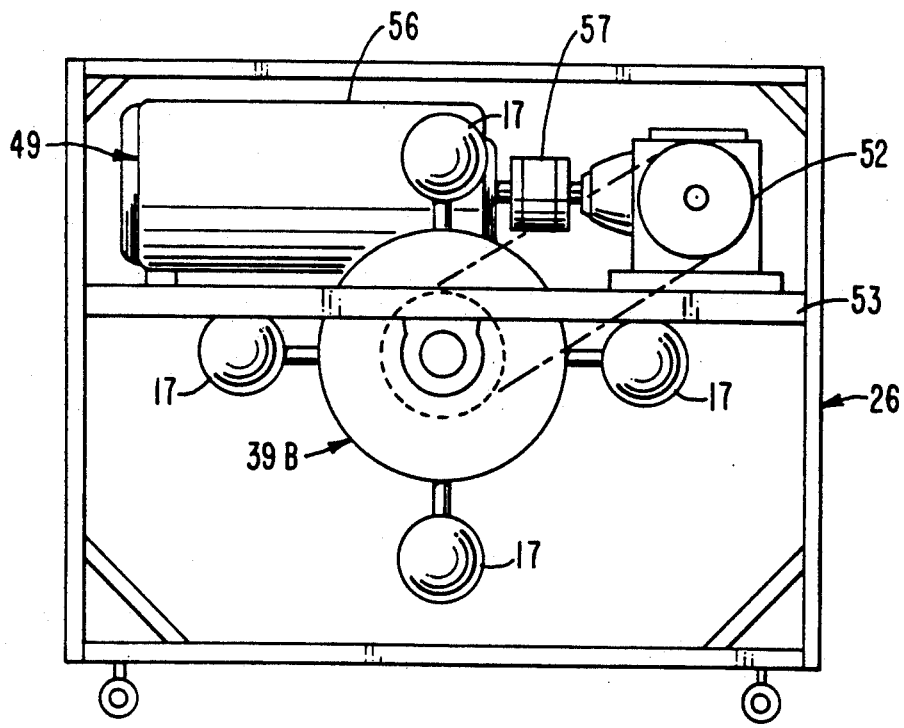
FIG. 7 is a side elevational view of the apparatus of FIG. 6.

Drive means 49 is provided for effecting joint rotation of the inner wheels 47A and 47B with their respective outer wheels 44A and 44B. As may best be seen in FIGS. 6 and 7 of the drawings, the drive units 39A and 39B are revolved at desired speeds by belt means 51A and 51B which are rotated in opposite directions by a gear unit 52 mounted on a support member 53 extending across and secured to a frame 54 attachable to the object (not shown) to be driven in a lineal direction. As shown in FIGS. 6 and 7 of the drawings, the drive means 49 provides a motor or engine 56 having a drive connection 57 to the gear unit 52, the motor 56 also being supported on member 53. The counterrotating drive units 39A and 39B are journaled on the central shaft 24 which extends across and is secured to the frame 54.

The radial members 16 are here in the form of generally radially extending rods slidably mounted for endwise movement through the openings 22 in rim 21 and the corresponding openings 23 in rim 19. The mass units 17 are carried on the outer ends 32 of each of the radially extending rods 16, and the inner and outer orbit limiting keepers 18A and 18B, respectively, are adjustably mounted in spaced relation along each of the rods 16 by a distance approximately equal to the average distance from the inner peripheries of the cylindrical walls 26A, 26B to the inner peripheries of the cylindrical walls 48A, 48B so that the radius of orbit 15, 15A of the mass unit 17 is varied by alternate engagement of the orbit limiting keepers 18A, 18B with the inner peripheries of the cylindrical walls 46A, 46B and 48A, 48B. This varies the centrifugal force exerted by each of the mass units 17 as they orbit with respect to the common axis 12 and generates unbalanced centrifugal forces.

The method of the present invention for accomplishing conversion of rotary motion to lineal motion utilizes the steps of orbiting a first mass unit alternately about spaced centers of rotation with each such orbit 15, 15A extending for approximately one-half of a complete circle so as to produce a first unbalanced centrifugal force. A second mass unit similar to the first mass unit is orbited side-by-side with the first mass unit but in the opposite direction to produce a second unbalanced centrifugal force. The spaced centers of rotation are adjusted relative to each other so that the resultant of the first and second unbalanced centrifugal forces is a substantially straight line extending in a desired direction.

From the foregoing, it will be apparent that the present invention provides an efficient method and self-contained apparatus for converting rotary motion to lineal motion by providing unbalanced centifical forces which act together to drive the apparatus along a substantially straight line path.

What is claimed is:

1. Apparatus for converting rotary motion to lineal motion, comprising
    first means for orbiting a plurality of whirling masses alternately around spaced centers of rotation with each such orbit describing approximately one-half of a complete circle,
    a second such means mounted in side-by-side relation to said first means,
    and means for rotating said masses of said first means and said masses of said second means in opposite directions.

2. Apparatus for converting rotary motion to lineal motion as described in claim 1, and wherein said masses are carried on elongated members radially slidable in said first and second means.

3. Apparatus for converting rotary motion to lineal motion, comprising
    outer driven means of predetermined radius mounted for rotation around a central axis,
    inner driven means of smaller radius than said outer driven means mounted for rotation about an offset axis in parallel spaced relation to said central axis whereby said inner driven means rotates eccentrically relative to said outer driven means,
    a plurality of generally radially extending elongated members mounted for endwise movement through portions of said inner and outer driven means in angular spaced relation to each other,
    units of equal mass on each of said members, and
    spaced keeper means on each of said members alternately engageable with said inner and outer driven means for constraining radially outward movement of said members so as to vary the radius of orbit of said unit.

4. Apparatus for converting rotary motion to lineal motion as described in claim 3, and wherein said inner and outer driven means are formed with peripheral rims, and said generally radially extending members are slidably mounted through openings formed in said rims.

5. Apparatus for converting rotary motion to lineal motion as described in claim 3, and wherein said outer driven means is journaled for rotation on a central shaft attachable to an object to be moved, and said inner driven means is journaled for rotation on an offset shaft mounted in parallel spaced relation to said central shaft.

6. Apparatus for converting rotary motion to lineal motion as described in claim 4, and wherein said members are slidably mounted for radial movement with respect to said driven means through bearing sleeves mounted in said rim.

7. Apparatus for converting rotary motion to lineal motion as described in claim 6, and wherein said bearing sleeves are tapered to accomodate tilting of said members relative to said driven means caused by said eccentric rotation of said inner driven means relative to said outer driven means.

8. Apparatus for converting rotary motion to lineal motion as described in claim 3, and wherein said units of equal mass are mounted on the outer ends of said members in radially spaced relation to said outer driven means whereby said units of equal mass move alternately toward and away from the outer periphery of said outer driven means in variable orbits responsive to the eccentricity of said inner driven means relative to said outer driven means.

9. Apparatus for converting rotary motion to lineal motion as described in claim 3, and wherein said keeper means on each of said members are spaced apart along said members by the same distance as the distance between said rims of said inner and outer driven means halfway between maximum and minimum eccentricity of said rim of said inner driven means relative to said rim of said outer driven means.

10. Apparatus for converting rotary motion to lineal motion as described in claim 3, and wherein said outer driven means comprises an outer wheel having a hub portion journaled to spin on a central shaft formed for attachment to an object to be moved in a lineal direction, said outer wheel having a peripheral rim provided by a cylindrical wall.

11. Apparatus for converting rotary motion to lineal motion as described in claim 10, and wherein said inner driven means comprises an inner wheel having a hub portion journaled to spin on an offset shaft also formed for attachment to said object to be moved in a lineal direction and with the axis of said offset shaft in parallel spaced relation to the axis of said central shaft, said inner wheel having a peripheral rim provided by a cylindrical wall.

12. Apparatus for converting rotary motion to lineal motion as described in claim 3, and wherein a pair of similar drive units each having said inner and outer driven means with said radially extending members and said units of equal mass and keeper means are carried in side-by-side relation for coaxial counterrotation about said central axis and said offset axis whereby the unbalanced forces produced by the two drive units combine to produce a resultant straight line force on the combined drive units.

13. Apparatus for converting rotary motion to lineal motion, comprising first and second side-by-side outer wheels spinnable in opposite directions about a common axis and having cylindrical peripheral walls of equal diameter, first and second inner wheels of smaller diameter than said outer wheels positioned at least partially within said first and second outer wheels, respectively, and formed for joint rotary movement with said outer wheels, said inner wheels having peripheral cylindrical walls of equal diameter, said inner wheels being mounted for rotation about an offset axis in parallel spaced relation to said common axis so that said peripheral cylindrical walls of said inner wheels are eccentric to said peripheral cylindrical walls of said outer wheels whereby the spacing between said walls of said inner and outer wheels varies as said inner and outer wheels are rotated jointly, drive means for effecting joint rotation of said inner wheels with their outer wheels, a plurality of generally radially extending rods slidably mounted through said inner and outer walls in equal angular spacing, a mass unit carried on the outer end of each of said radially extending rods, inner and outer orbit limiting keepers mounted in spaced relation along each of said rods by a distance equal to the average distance between the inner periphery of said cylindrical wall of said outer wheel and the inner periphery of said cylindrical wall of said inner wheel so that the radius of orbit of said mass unit is varied by alternate engagement of said orbit limiting keepers with the inner peripheries of said cylindrical walls of said outer and inner wheels for varying the centrifugal force exerted by each of said mass units as they orbit with respect to said common axis.

14. The method of converting rotary motion to lineal motion, comprising orbiting a first mass unit alternately about spaced centers of rotation with each such orbit extending for approximately one-half of a complete circle as to produce a first unbalanced centrifugal force, orbiting a second mass unit side-by-side with said first mass unit but in the opposite direction to produce a second unbalanced centrifugal force, and adjusting said spaced centers of rotation relative to each other so that the resultant of said first and second unbalanced centrifugal forces is a substantially straight line extending in a desired direction.

* * * * *